United States Patent
Daudi

(10) Patent No.: US 6,196,359 B1
(45) Date of Patent: Mar. 6, 2001

(54) VEHICLE BRAKING SYSTEM AND BRAKING METHOD USING A PLURALITY OF TWO-STATE ACTUATORS

(75) Inventor: Anwar R. Daudi, Ann Arbor, MI (US)

(73) Assignee: Hayes Lemmerz International, Inc., Northville, MI (US)

(*) Notice: Subject to any disclaimer, the term of this patent is extended or adjusted under 35 U.S.C. 154(b) by 0 days.

(21) Appl. No.: 09/058,638

(22) Filed: Apr. 10, 1998

(51) Int. Cl.$^7$ ................................................ F16D 55/228
(52) U.S. Cl. ................ 188/72.5; 188/156; 188/106 P; 303/9.61
(58) Field of Search ................ 188/79.51, 72.5, 188/156, 163, 180, 181 T, 31, 60, 69, 106 P, 158, 344; 303/113.4, 155, 9.61, 9.64

(56) References Cited

U.S. PATENT DOCUMENTS

| | | | |
|---|---|---|---|
| 2,465,810 | * 3/1949 | MacDonald et al. | 192/66.21 |
| 4,030,576 | * 6/1977 | Pringle | 188/71.8 |
| 4,099,601 | * 7/1978 | Pittman | 188/163 |
| 4,209,202 | * 6/1980 | Jones | 188/181 A |
| 4,491,202 | 1/1985 | Schmitt | 188/71.5 |
| 4,778,223 | * 10/1988 | Inoue | 188/106 P |
| 4,848,851 | * 7/1989 | Kuraoka et al. | 303/155 |
| 4,848,852 | * 7/1989 | Inoue et al. | 188/106 P |
| 5,172,792 | 12/1992 | Cartwright et al. | 188/71.1 |
| 5,178,235 | 1/1993 | Montalvo, III et al. | 188/18 A |
| 5,361,877 | * 11/1994 | Graham | 188/170 |
| 5,363,943 | * 11/1994 | Iwashita et al. | 188/72.5 |
| 5,474,161 | 12/1995 | Eaton, III et al. | 188/264 A |
| 5,477,944 | * 12/1995 | Bryan et al. | 188/72.5 |
| 5,575,542 | * 11/1996 | Tanaka et al. | 303/155 |
| 5,810,121 | * 9/1998 | Anger et al. | 188/72.5 |
| 5,915,504 | * 6/1999 | Doricht | 188/71.8 |

* cited by examiner

Primary Examiner—Robert J. Oberleitner
Assistant Examiner—Mariano Sy
(74) Attorney, Agent, or Firm—Marshall & Melhorn, LLC

(57) ABSTRACT

The invention is directed to a vehicle braking system having a plurality of two-state actuators disposed at each vehicle wheel and method braking same. The vehicle braking system further includes a brake rotor or brake drum secured to each vehicle wheel for rotation therewith. The brake rotors or drums each include a plurality of friction surfaces. A plurality of brake pads are disposed adjacent the friction surfaces such that a different brake pad corresponds to each friction surface. A different two-state actuator corresponding to each brake pad is disposed adjacent the corresponding brake pad. Each two-state actuator is either unactuated or actuated to provide a maximum translational force against the corresponding brake pad to achieve the desired braking force requirements at each vehicle wheel.

17 Claims, 4 Drawing Sheets

VEHICLE BRAKING SYSTEM AND BRAKING METHOD USING A PLURALITY OF TWO-STATE ACTUATORS

BACKGROUND OF INVENTION

This invention relates in general to a vehicle braking system and in particular to the use of two state actuators for braking wheeled vehicles.

Vehicles are commonly slowed and stopped with hydraulic or pneumatic braking systems. These systems vary in complexity but typically include a pressure vessel, such as master cylinder, for pressurizing the hydraulic fluid or air, fluid conduits arranged in two or more separate brake circuits, and wheel brakes connected to each circuit.

Typical wheel brakes include a rotor or drum having a friction section with friction surfaces disposed thereon. The rotor or drum is attached to one or more of the braked vehicle wheels for rotation therewith. The wheel brakes also include one or more brake pads or brake shoes having friction material disposed thereon. The brake pads or shoes are located adjacent the rotor or drum friction surfaces. One or more pressure actuators are secured to a non-rotating component of the vehicle, such as the vehicle frame, at each braked wheel. The pressure actuators typically include a wheel brake cylinder having a moveable piston operatively connected to one or more of the brake pads or brake shoes.

When the driver brakes the vehicle, the pressure vessel pressurizes the fluid in one or more of the brake circuits. The fluid pressure is transmitted through the conduits to the pressure actuators. The pressure actuators apply translational forces against the pads or shoes which in turn press against the friction surfaces of the rotating rotor or drum. As the brake pads or shoes press against the moving friction surfaces, braking forces including frictional forces are generated which oppose the rotation of the wheels and slow the vehicle.

Advances in braking technology have led to the introduction of Anti-lock braking or ABS systems. An ABS system monitors the rotation of the wheels and maintains the wheel speed within a selected slip range to achieve maximum braking forces. Pressure regulating devices, such as valves, selectively relieve and reapply pressurized fluid in the circuits communicating with the corresponding wheel brake cylinders to control the wheel speed.

Further advances have led to the introduction of Stability Control systems which improve the stability of the vehicle by using braking forces to counteract excessive cornering forces. These forces and other vehicle parameters are detected by sensors which signal an electronic control unit to automatically operate selective pressure regulators, such as valves. The pressure regulators control the fluid pressure applied to the pressure actuators thereby generating the desired braking forces without the driver applying the brakes.

These known braking systems can be characterized as pressure proportionate braking systems since the magnitude of the fluid pressure received by the pressure actuators determines the magnitude of the braking forces produced at the respective wheels. The pressure actuators can be actuated to a plurality of different states in which the pressure actuator in each state provides a different translational force to the brake pads or shoes. The translational force applied to the brake pads or shoes determines the braking forces generated at the rotor or drum and the associated vehicle wheel. These pressure controlled braking systems require complicated pressure regulating controls to achieve the precise fluid pressures at the pressure actuators needed for maximum braking performance under all conditions.

It would be desirable to provide a braking system which achieves the desired braking performance in all operating conditions without the need to achieve such precise pressure control of conventional pressure controlled braking systems.

SUMMARY OF THE INVENTION

The invention is directed to a vehicle braking system having a plurality of two-state actuators disposed at each vehicle wheel and method braking same. The vehicle braking system further includes a brake rotor or brake drum secured to each vehicle wheel for rotation therewith. The brake rotors or drums each include a plurality of friction surfaces. A plurality of brake pads are disposed adjacent the friction surfaces such that a different brake pad corresponds to each friction surface. A different two-state actuator corresponding to each brake pad is disposed adjacent the corresponding brake pad. Each two-state actuator is either unactuated or actuated to provide a maximum translational force against the corresponding brake pad to achieve the desired braking force requirements at each vehicle wheel.

The invention is also directed to a method of braking a wheeled vehicle using a plurality of two-state actuators at each vehicle wheel including the steps of sensing vehicle operating parameters via one or more sensors, determining the brake force requirements needed to achieve the maximum braking performance given the sensed vehicle operating parameters, selecting the number of two-state actuators to be actuated at each wheel, and actuating the selected two-state actuators to achieve the desired braking performance.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

Figure 1:
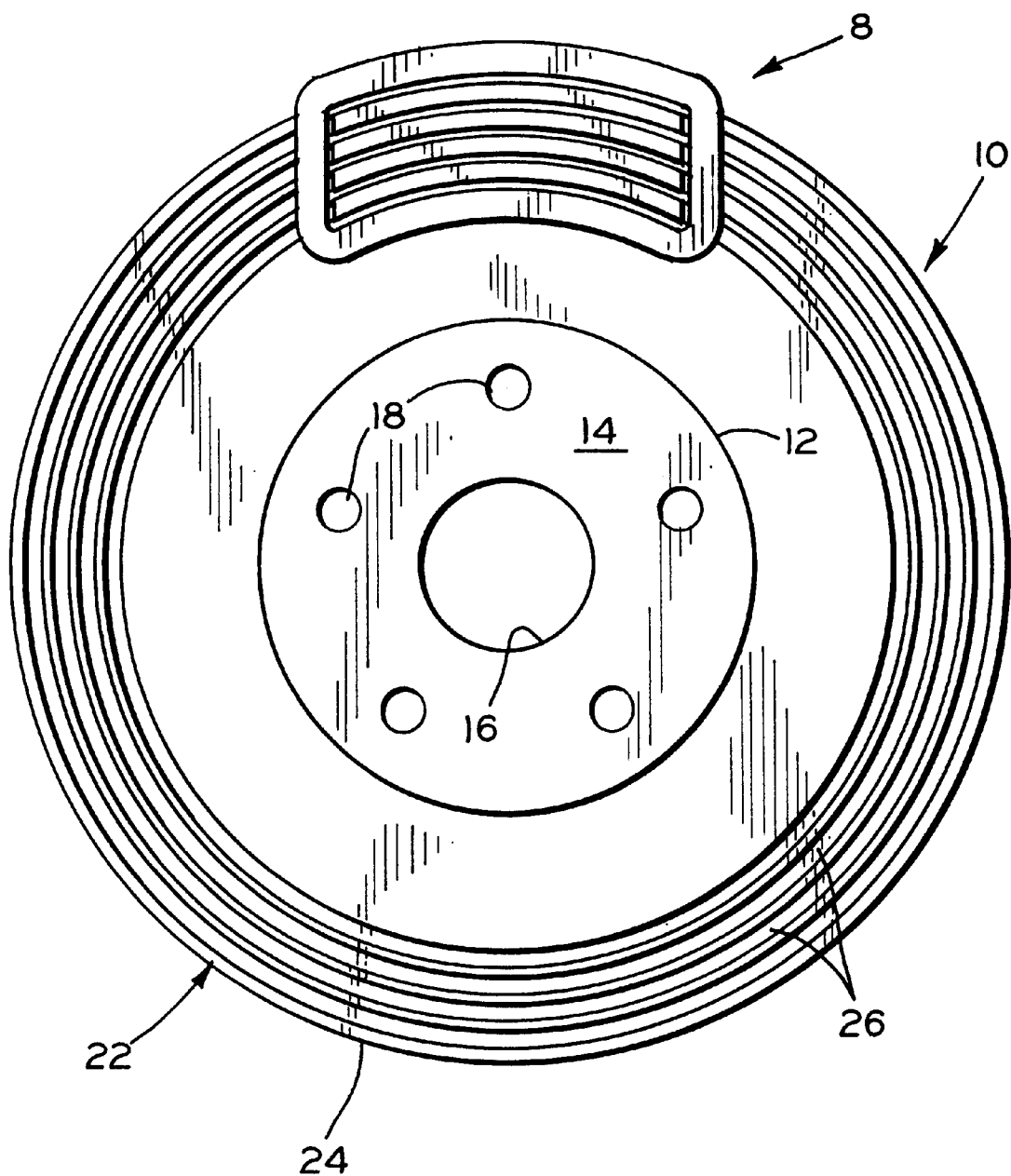
FIG. 1 is a plan view of a rotor having a plurality of friction surfaces adapted to interface with brake pads actuated by two-state actuators in accordance with the present invention.
Figure 2:
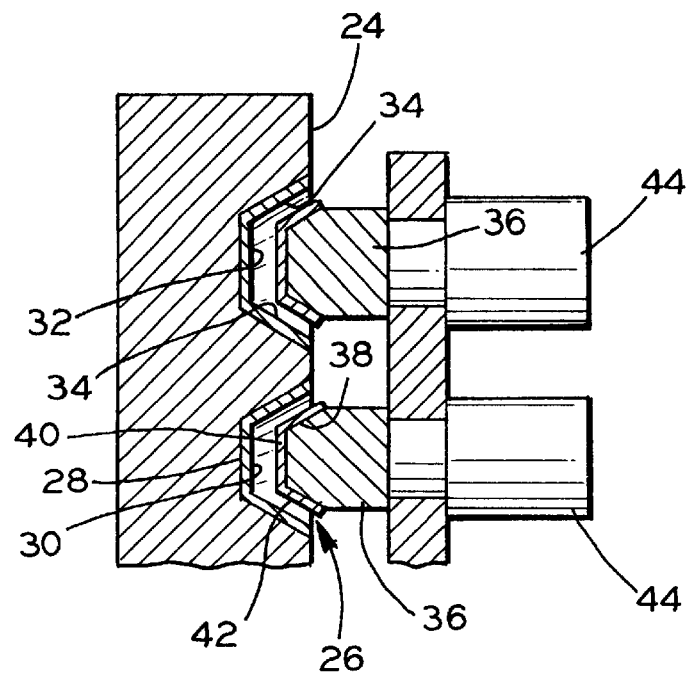
FIG. 2 is partial elevational sectional view of a portion of a rotor having a plurality of friction surfaces adapted to interface with brake pads actuated by two-state actuators in accordance with the present invention.
Figure 3:
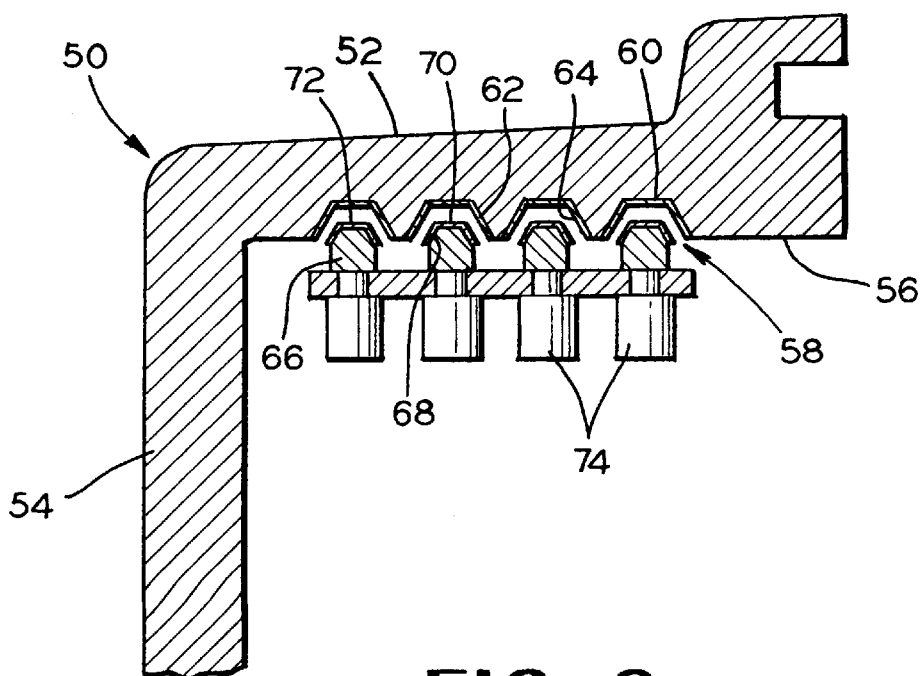
FIG. 3 is partial elevational sectional view of a second embodiment of a vehicle braking system including a drum having a plurality of friction surfaces adapted to interface with brake pads actuated by two-state actuators in accordance with the present invention.

For purposes of description herein, the terms "upper," "lower," "right," "left," "rear," "front," "vertical," "horizontal," and derivatives thereof shall relate to the invention oriented in FIGS. 1, 2 and 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawings, there is illustrated in FIGS. 1 and 2, braking system denoted generally by the reference numeral 8. The braking system includes a rotor 10 formed in accordance with the invention. The rotor is preferably constructed from cast iron or aluminum MMC, however, the rotor may be constructed of any suitable material. The rotor 10 includes a central hub or hat section 12 having a mounting surface 14 for mounting the rotor 10 on an associated drive member (not shown), such as a spindle or vehicle axle. The mounting surface 14 is preferably generally circular, although other suitable shape may be used. A central pilot aperture 16 is formed in the center of the mounting surface 14 for receiving a spindle hub or the like (not shown). A plurality of circumferentially spaced apart fastener apertures 18 are also formed in the mounting surface 14 for receiving fasteners (not shown) for securing the rotor 10 on an associated drive mechanism in the conventional manner.

The rotor 10 also preferably includes a friction section 22 extending radially outwardly from the hat section 12 and including an annular friction plate 24. A plurality of circular friction surfaces 26 are disposed on opposite sides of the friction plate 24. The friction surfaces 26 are arranged in a coaxial, radially spaced apart manner around the friction plate 24. The number of friction surfaces 26 disposed on each side of the friction plate 24 may be as low as two or three and as high as cost or physical space requirements allow.

Alternatively, the friction section includes a pair of annular friction plates (not shown) joined together by spacers or posts in a mutually parallel, spaced apart relationship to form spaces or vents therebetween. A plurality of circular, radially spaced friction surfaces are disposed on the outer, oppositely directed sides of the friction plates in a coaxial arrangement.

Each of the circular friction surfaces 26 preferably includes a groove 28 formed in the friction plate 24. A layer of rotor friction material 30 preferably covers the surface of the grooves 28. The rotor friction material 30 is preferably a non-asbestos friction material, however, any suitable known friction material may be used. Alternatively, the rotor friction material 30 may not be used. The grooves 28 extend completely around the annular friction plate to form a continuous groove. The grooves 28 preferably have a flat bottom surface 32 defining the deepest part of the groove, and sloping walls 34 which extend outwardly from the bottom 32 to the surface of the friction ring 24. However, alternatively, the grooves 28 may have any suitable cross sectional shape.

A plurality of rotor brake pads 36 are disposed adjacent the rotor friction surfaces 26. The number of rotor brake pads 36 equals the number of friction surfaces 26 such that each brake pad corresponds to a particular friction surface. Each rotor brake pad 36 includes a shaped surface 38 having a shape which is complementary to the shape of the groove 28. Friction material 40 covers the shaped surface 38 forming a brake pad friction material surface 42 having a shape complementary to the shape of the corresponding groove 28. Each brake pad 36 is disposed adjacent the corresponding groove 28 such that a translational force directed against the brake pad 36 towards the rotor friction surface 26 will move the brake pad into engagement with the corresponding rotor friction surface. The complementary shape of the brake pad 36 enables the shaped friction material surface 42 of the pad to be received into the corresponding groove 28 such that most of the shaped friction material surface of the pad will contact the surface of the corresponding groove to produce the maximum braking force for inhibiting the rotation of the brake rotor 10 and attached wheel, thereby slowing the vehicle.

Alternatively, the rotor friction surfaces 26 may be flat and not include grooves. The brake pad shall then also have a flat shaped surface 38 and a flat brake pad friction material surface 42 to match the friction surface and insure maximum contact between the rotor friction surface 26 and the brake pad friction material surface 42.

A plurality of two-state actuators 44 are disposed adjacent the brake pads 36 such that one actuator is disposed adjacent each corresponding brake pad. The actuator 44 may be hydraulically operated, pneumatically operated, electrically operated, operated by a phase change material, or operated in any other known manner. Each of said two-state actuators 44 are independently controlled to achieve one of two possible states. The first state is an unactuated state in which the actuator 44 does not provide a translational force against the corresponding adjacent brake pad 36. The second state is a fully actuated state in which the actuator 44 provides the maximum translational force against the adjacent brake pad 36 to press the brake pad friction material surface 42 against the corresponding rotor friction surface 26, as described above, to provide a metered unit of braking force for braking the vehicle. The number of metered units of braking force available for each rotor is equivalent to the number of brake pads 36 having corresponding actuators 44. The greater the number of metered brake force units available, the more precise the control of the braking forces at any particular rotor. Although only two pads 36 and corresponding actuators 44 are shown, the number used on each rotor is only limited by cost or the physical space available.

Referring now to FIG. 3, a second embodiment of the invention is illustrated having a brake drum 50. The brake drum includes a cylindrical drum wall 52 attached to a generally circular mounting surface 54 (a portion of which is shown) for mounting the drum on an associated drive member (not shown). The drum wall includes a radially inner surface 56 having a plurality of circular, radially spaced apart friction surfaces 58 disposed thereon.

Each of the circular drum friction surfaces 58 of the drum include a groove 60 formed therein. The friction surface grooves 60 are substantially identical to the rotor friction surface grooves 28 and therefor shall not be described further. A layer of friction material 62 covers the surface of the groove 60 to form a drum friction material surface 64 in a similar manner as the rotor friction surface grooves 28. The friction material 62 is preferably a non-asbestos friction material, however, any suitable known friction material may be used.

A plurality of drum brake pads 66 are disposed adjacent the drum friction surfaces 58. The drum brake pads 66 are substantially similar to the rotor brake pads 36 described above. The number of drum brake pads 66 equals the number of friction surfaces 58 such that each brake pad corresponds to a particular friction surface. Each drum brake pad 66 includes a shaped surface 68 having a shape which is complementary to the shape of the groove 60. Friction material 70 covers the shaped surface 68 forming a brake pad friction material surface 72 having a shape complementary to the shape of the corresponding groove 60. Each brake pad 66 is disposed adjacent the corresponding groove 60 such that a translational force directed against the brake pad 66 towards the drum friction surface 58 will move the brake pad into engagement with the corresponding drum friction surface.

A plurality of drum two-state actuators 74 are disposed adjacent the drum brake pads 66 such that one actuator is disposed adjacent a single corresponding brake pad. The two-state actuators 74 used to move the drum brake pads 66 is substantially similar to the rotor two-state actuator 44 and therefor shall not be described in detail. Each of said two-state actuators 74 are independently controlled to achieve one of two possible states which are similar to the states for the rotor two-state actuators 44 described above. Although four drum brake pads 66 and corresponding actuators 74 are shown, the number used is only limited by cost or the physical space available. The greater the number of two-state actuators 74 and pads 66 used for a particular drum 50, the more precise the control of the braking forces at the associated wheel.

Figure 4:
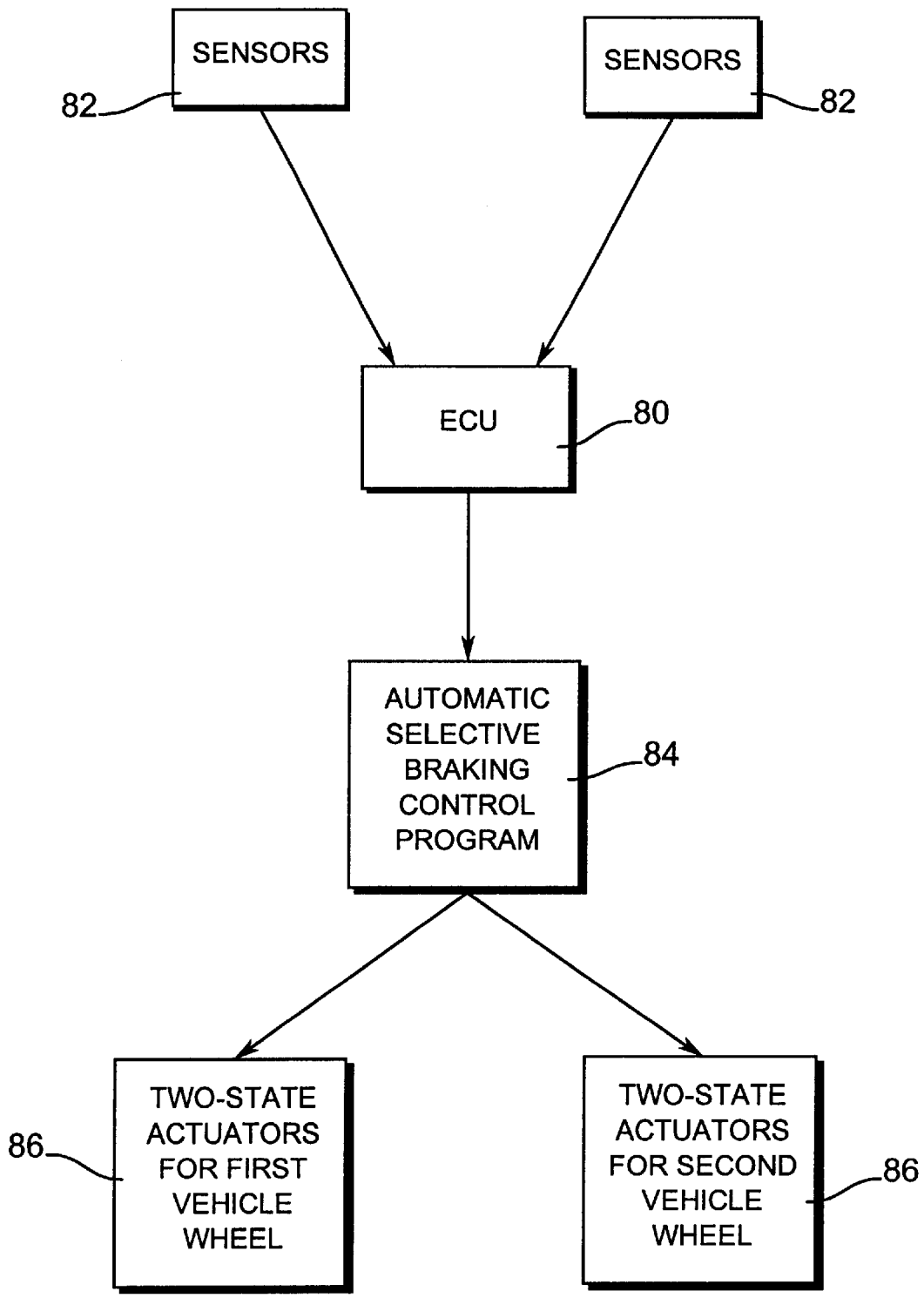
FIG. 4 is a block diagram illustrating components of a wheeled vehicle braking system in accordance with the present invention.

Referring now to FIG. 4, practical vehicle operation shall be described. The number of two-state actuators actuated to the second, actuated state determines in part the magnitude of the braking forces, including frictional forces, which are generated for that particular wheel. Actuation of the proper number of actuators for each rotor or drum may occur manually when the vehicle operator steps on the brake pedal. Alternatively, it may occur automatically under the guidance of an electronic control unit 80. The ECU 80 uses sensors 82 to detect vehicle parameters such as speed, cornering forces, and steering wheel angle to determine the braking force requirements for each wheel for the particular sensed vehicle parameters.

After the braking force requirements are determined, an automatic selective braking control program 84 (hereinafter ASBC program) is used to determine how many two-state actuators are actuated for each vehicle wheel. The automated program 84 accepts the braking force requirements from the ECU 80 and automatically actuates the proper number of actuators at each vehicle wheel 86 (only two of which are shown) to achieve the maximum braking performance.

During cornering, the ECU 80 and ASBC program 84 work together to determine the braking force requirements for each vehicle wheel, and to actuate the proper number of two-state actuators. For example, during a right turn, the braking force requirements of the right wheels will be greater than those of the left. This will be determined by the ECU 80 using the sensor data. Next, the proper number of right and left wheel two-state actuators are actuated by the ASBC program 84 to provide braking forces capable of counteracting the cornering forces thereby increasing vehicle stability.

During high speed braking, larger braking forces may be needed to stop the vehicle at all wheels. Again, the ECU determines that the greater braking forces are required, and the ASBC program 84 actuates a larger number of two-state actuators per vehicle wheel to achieve the greater braking forces as requested by the ECU 80.

During city traffic conditions, the ECU may determine that a variety of braking forces may be required in any given event. These braking force requirements are met by the ASBC program 84 as described above.

Figure 5:
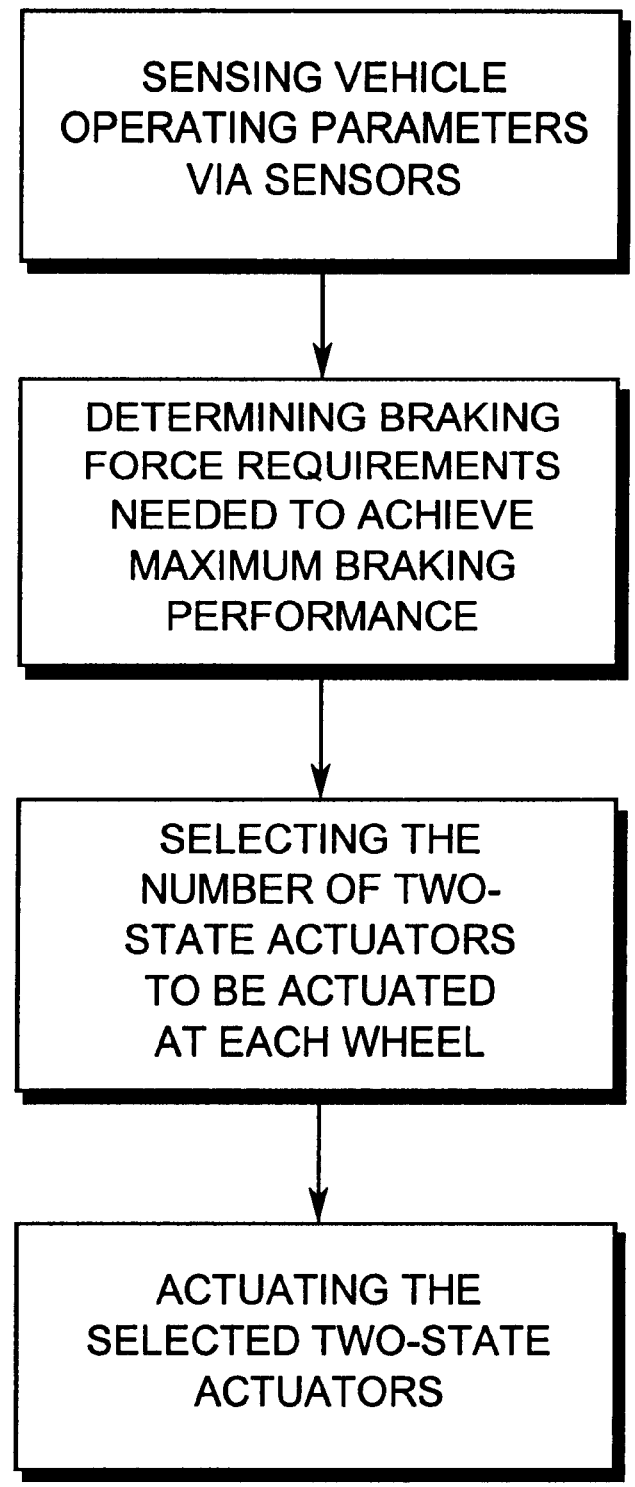
FIG. 5 is a flow diagram illustrating a method of braking a wheeled vehicle using a plurality of two-state actuators disposed at each vehicle wheel in accordance with the present invention.

Referring now to FIG. 5, a flow diagram is shown illustrated a method of braking a wheeled vehicle using a plurality of two-state actuators disposed at each vehicle wheel. The method includes the steps of sensing vehicle operating parameters via one or more sensors, determining the brake force requirements needed to achieve the maximum braking performance given the sensed vehicle operating parameters, selecting the number of two-state actuators to be actuated at each wheel, and actuating the selected two-state actuators to achieve the desired braking performance.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A method of braking a wheeled vehicle comprising:
   providing a plurality of independently selectable two-state actuators disposed at one of the vehicle wheels for providing a translational force for braking the vehicle, said two-state actuators each having only two states including an actuated state in which the actuator is only capable of being actuated to achieve a maximum translational force and an unactuated state;
   selecting a number of the two-state actuators to be actuated; and
   actuating the selected two-state actuators to brake the vehicle.

2. The method defined in claim 1 further including sensing vehicle operating parameters via one or more sensors.

3. The method defined in claim 2 wherein the sensing includes sensing one or more of cornering forces, steering wheel angle and speed.

4. The method defined in claim 2 further including determining the brake force requirements needed to achieve the desired braking performance given the sensed vehicle operating parameters.

5. The method defined in claim 1 wherein said two-state actuators are electrically operated.

6. The method defined in claim 1 wherein said two-state actuators are pneumatically operated.

7. The method defined in claim 1 wherein said two-state actuators are hydraulically operated.

8. The method defined in claim 1 further including providing a brake pedal for actuating the selected two-state actuators by the vehicle operator.

9. The method defined in claim 8 further including providing an electronic control unit for automatically controlling the actuation of the two-state actuators.

10. The method defined in claim 4 further including providing an electronic control unit for determining the brake force requirements needed to achieve the desired braking performance.

11. A method of braking, a wheeled vehicle having a braking system comprising:
    providing a plurality of friction surfaces connected to one of the vehicle wheels;
    providing a plurality of independently selectable two-state actuators disposed at one of the vehicle wheels for providing a translational force against the friction surface for braking the vehicle said two-state actuators each having only two states including an actuated state in which the actuator is only capable of being actuated to achieve a maximum translational force and an unactuated state;

selecting a number of two-state actuators to be actuated; and actuating the selected two-state actuators to brake the vehicle.

12. The method defined in claim 11 further including sensing vehicle operating parameters with one or more sensors.

13. The method defined in claim 12 further including determining the brake force requirements needed to achieve a desired braking performance given the sensed vehicle operating parameters.

14. The method defined in claim 11 wherein each two-state actuator corresponds to an individual friction surface.

15. The method defined in claim 11 wherein the friction surface is disposed on a brake drum.

16. The method defined in claim 11 wherein the friction surface is disposed on a brake rotor.

17. The method defined in claim 11 further including, providing a brake pad and the braking force is a translational force for moving the brake pad against the friction surface to brake the vehicle.

* * * * *